UNITED STATES PATENT OFFICE.

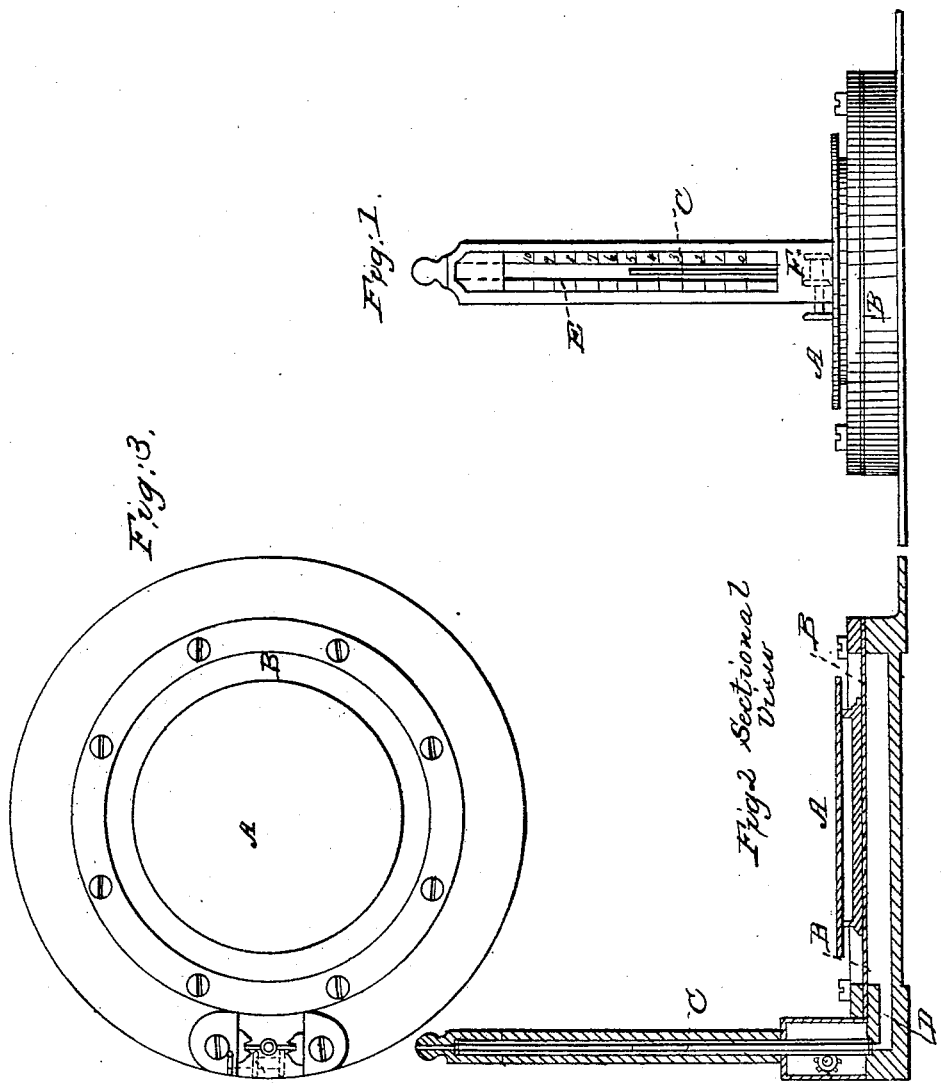

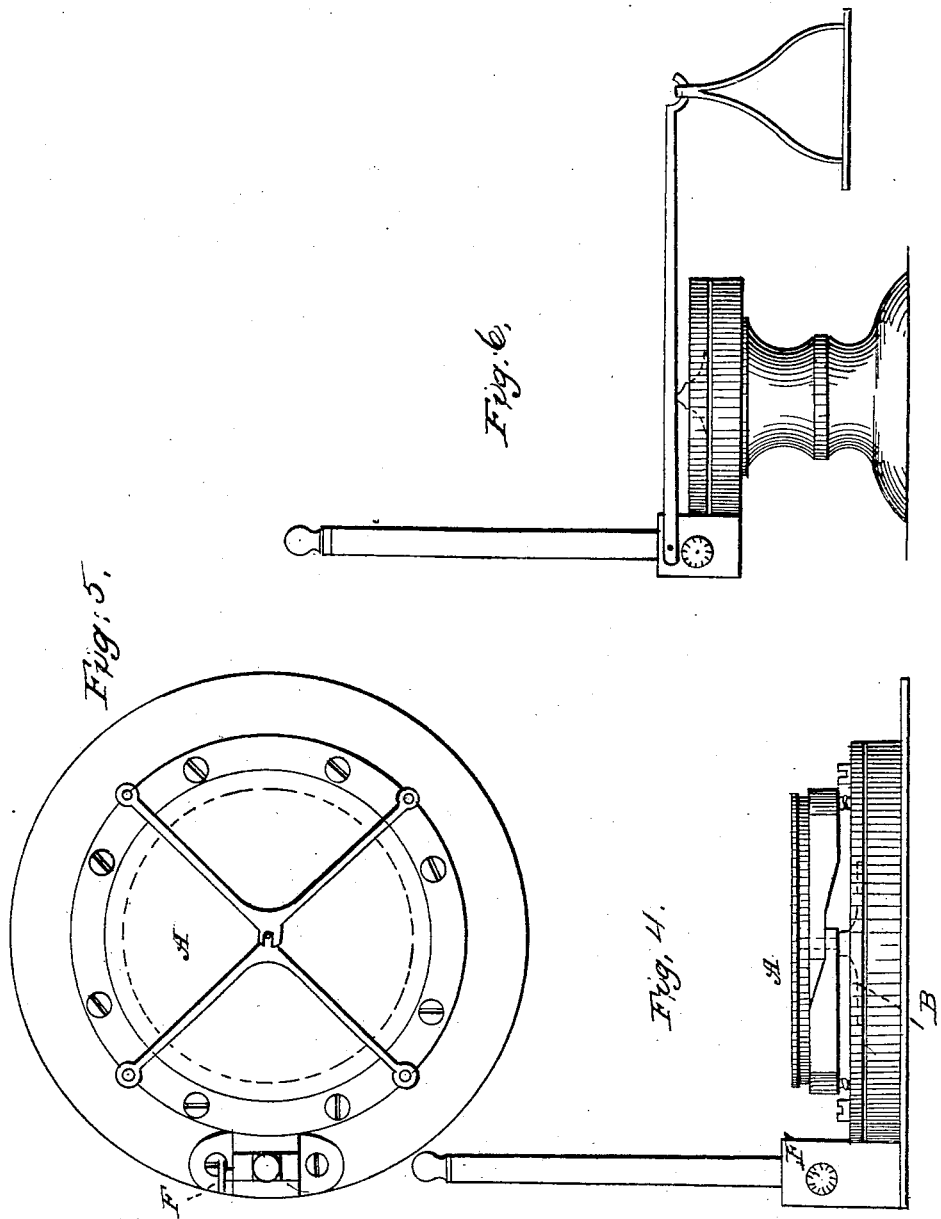

SAMUEL SQUIRE, OF BROOKLYN, NEW YORK.

HYDROSTATIC BALANCE.

Specification of Letters Patent No. 26,795, dated January 10, 1860.

*To all whom it may concern:*

Be it known that I, SAMUEL SQUIRE, of Brooklyn, in the county of Kings and State of New York, have invented a new and useful Hydrostatic Balance for Weighing Ponderable Substances; and I do hereby declare that the following is a full, clear, and exact description of the construction and operation of the same, reference being had to the annexed drawings, making a part of this specification, in which—

Figure 1 is a front elevation; Fig. 2, a sectional view, and Fig. 3 a ground plan.

A is the platform on which the substance to be weighed is placed, and B an elastic diaphragm on which it rests. Under the diaphragm is introduced a fluid substance, water or alcohol preferred, the same being shown by the red color. Any ponderable substance placed upon the platform A (the graduated scale having been previously adjusted by a method to be hereafter described) communicates a force or pressure through the diaphragm B to the surface of the liquid, which liquid is thereby forced through the channel D up the column C until it has attained an altitude which exactly balances the weight of the substance placed upon the platform A, and by making the tube in which this fluid column acts wholly or partly of glass the height of it may be readily ascertained and the true weight of the substance placed upon the platform A accurately determined by the graduated scale E. To the scale E is adapted a toothed wheel F by means of which it can be adjusted so that the zero point shall exactly correspond to the top of the fluid column.

Figs. 4 and 5 are an elevation and ground plan showing the application of a system of levers by which, for the purpose of weighing heavy substances, the force on the diaphragm may be diminished, the fluid column and adjustable scale being substantially the same as before described.

Fig. 6 represents a method of increasing the force on the diaphragm for the purpose of weighing light substances, the fluid column and adjustable scale being also the same as before described.

What I claim as my invention and desire to secure by Letters Patent is—

The diaphragm B adjustable index scale E, fluid column C and levers shown in Figs. 4 and 5 the whole constructed and arranged substantially as described.

SAMUEL SQUIRE.

Witnesses:
T. W. ROLLINS,
SAML. SEAMAN.